United States Patent [19]

Drescher

[11] Patent Number: 5,209,611

[45] Date of Patent: May 11, 1993

[54] CUTTING INSERT HAVING DUAL CUTTING EDGES ON ONE SURFACE AND HOLDING BODY FOR INSERT

[75] Inventor: Albert A. Drescher, St. Clair Shores, Mich.

[73] Assignee: Duramet Corporation, Warren, Mich.

[21] Appl. No.: 763,431

[22] Filed: Sep. 20, 1991

[51] Int. Cl.⁵ .................... B23D 61/04; B23C 5/20
[52] U.S. Cl. .................... 407/48; 407/33; 407/51; 407/114
[58] Field of Search .......... 407/30, 33, 34, 42, 407/48, 60, 61, 113, 114, 51, 55, 56, 58, 115, 116

[56] References Cited

U.S. PATENT DOCUMENTS

| | | |
|---|---|---|
| 889,829 | 6/1908 | Valentine et al. ............ 407/60 X |
| 1,533,314 | 4/1925 | Fox . |
| 3,158,922 | 12/1964 | Reese . |
| 3,486,211 | 12/1969 | Greenleaf . |
| 3,701,187 | 10/1972 | Erkfritz . |
| 3,729,808 | 5/1973 | Wolf et al. . |
| 3,887,975 | 6/1975 | Sorice et al. . |
| 3,940,835 | 3/1976 | Friedline et al. . |
| 4,463,645 | 8/1984 | Goellner ............ 407/60 X |
| 4,573,831 | 3/1986 | Lacey ............ 407/42 |
| 4,674,923 | 6/1987 | Ogilvie et al. ............ 407/31 |
| 4,729,697 | 3/1988 | Lacey ............ 407/42 |
| 4,867,616 | 9/1989 | Jakubowicz ............ 407/58 |

Primary Examiner—Steven C. Bishop
Attorney, Agent, or Firm—Gifford, Groh, Sprinkle, Patmore and Anderson

[57] ABSTRACT

A cutting tool insert to fit in a holding body for mounting to a rotating machine spindle. The cutting tool insert has multiple faces with one face having several in line cutting edges, one behind the other.

A vertical V-groove divides the second cutting edge. The cutting tool insert is symmetrical and is removable, turnable about 180° and replaceable to the holding body.

20 Claims, 7 Drawing Sheets

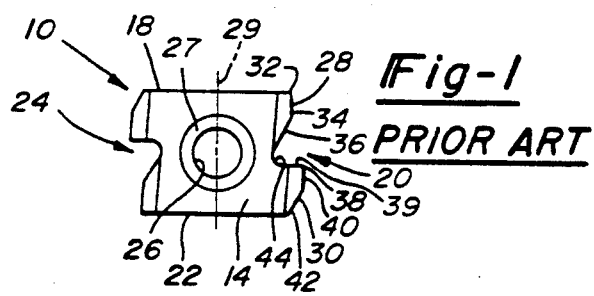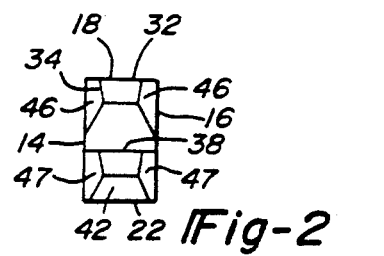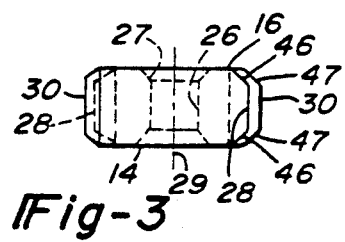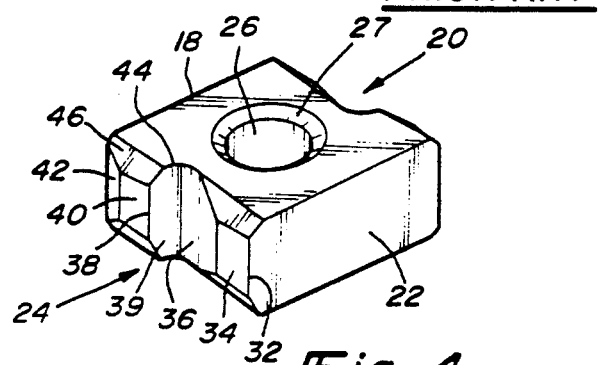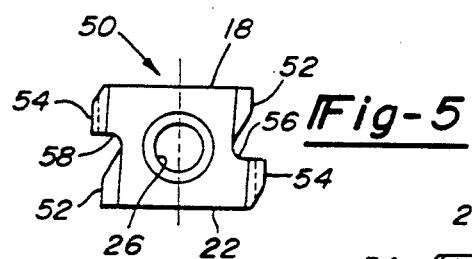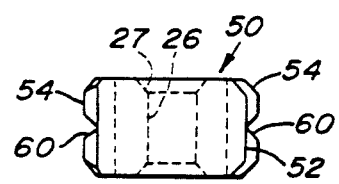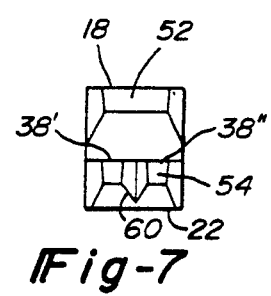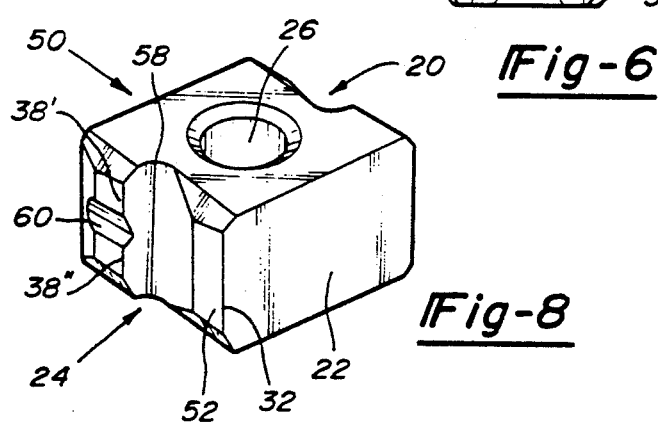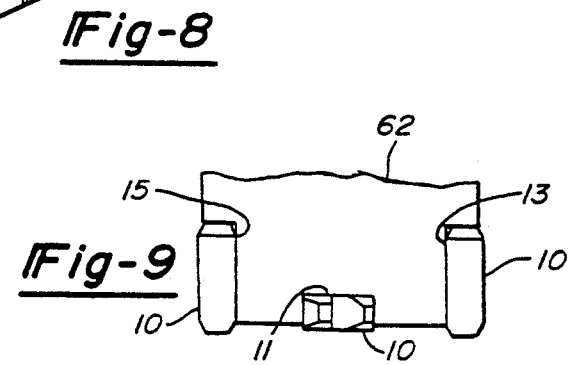

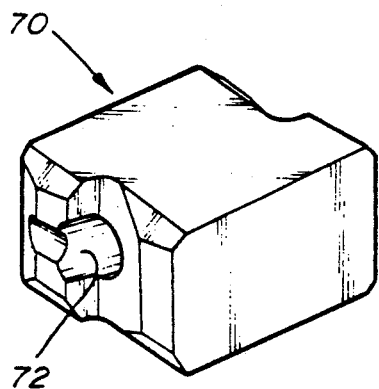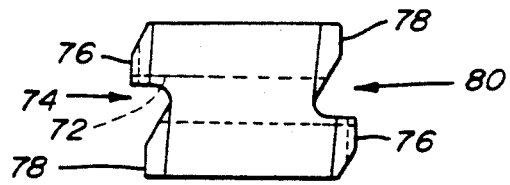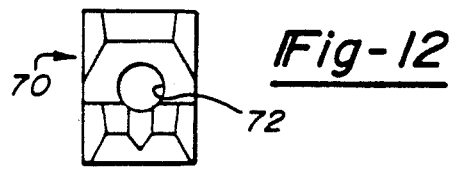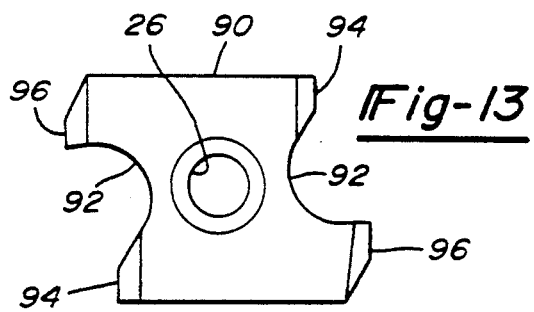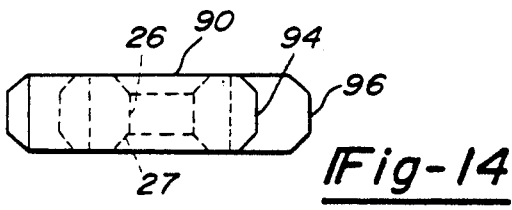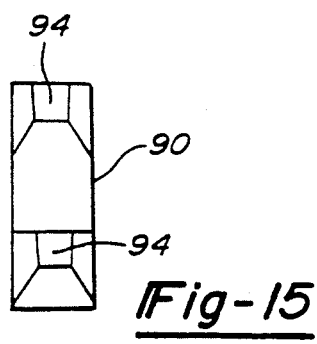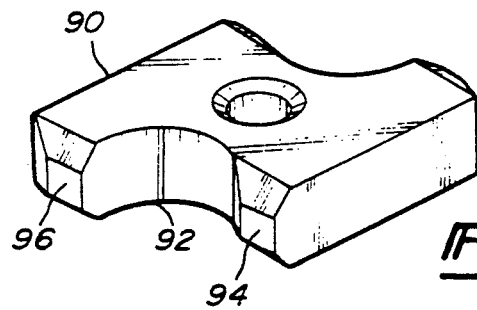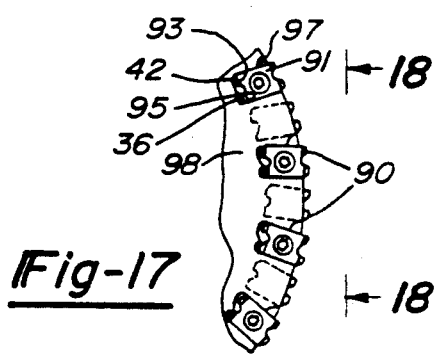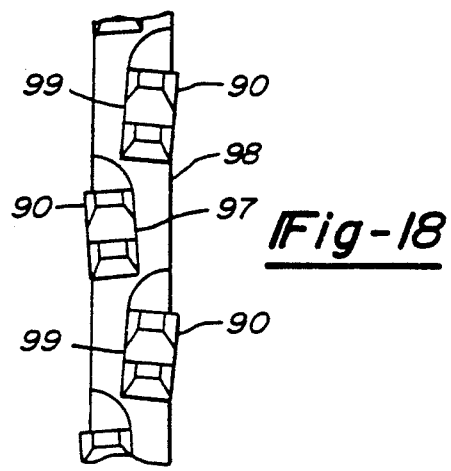

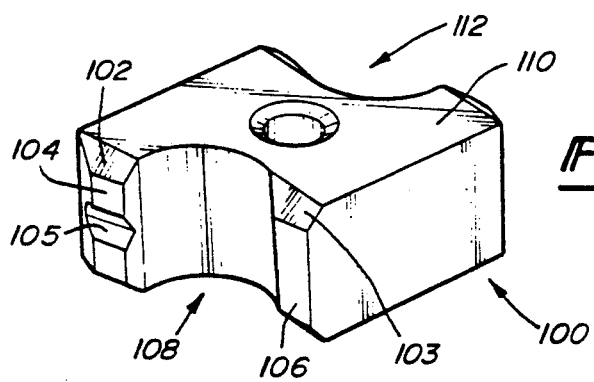
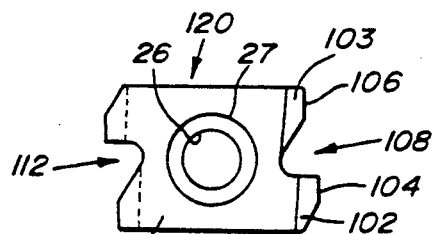
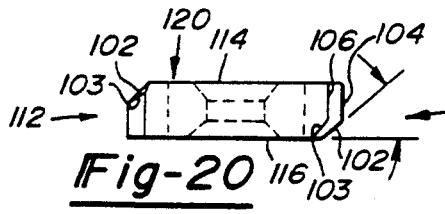
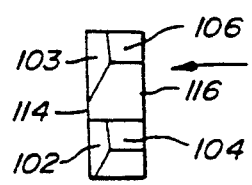
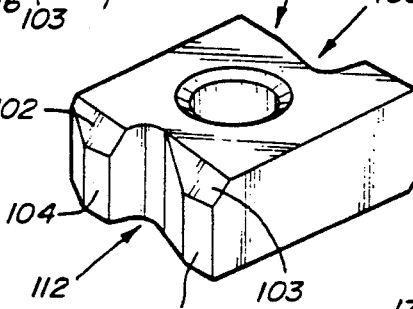
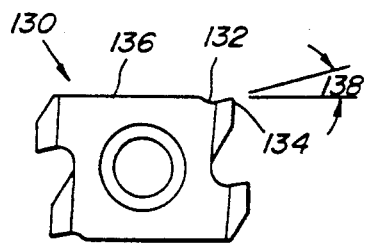
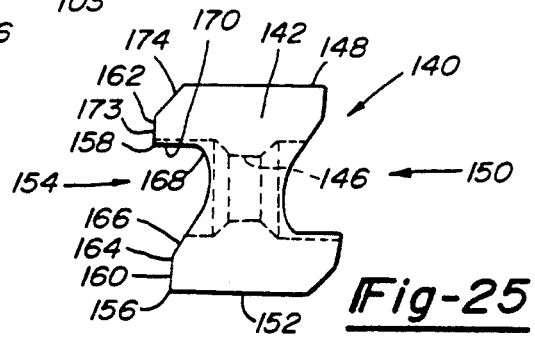
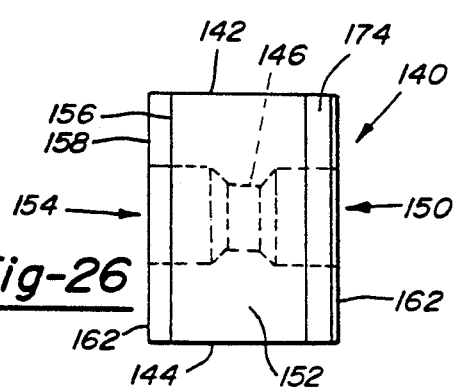
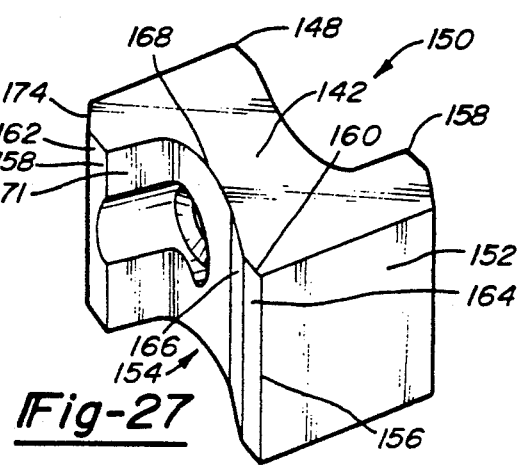

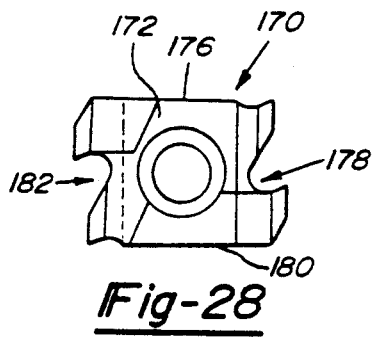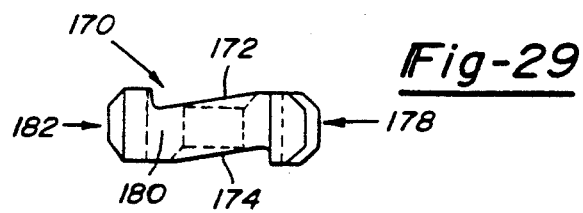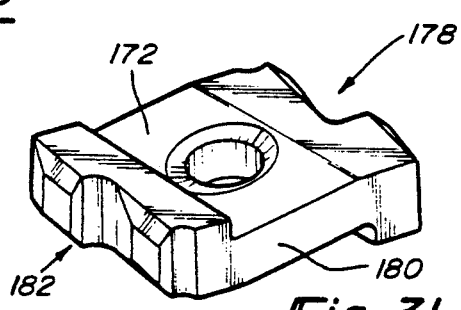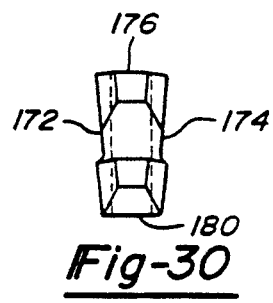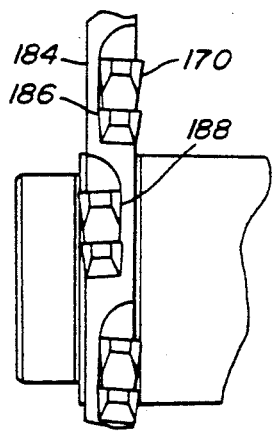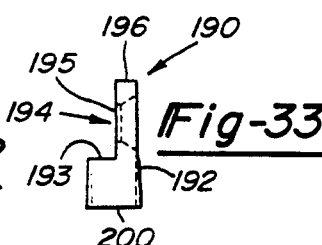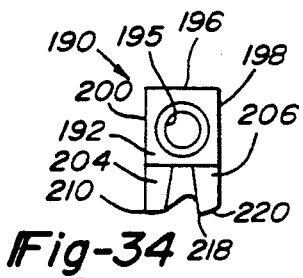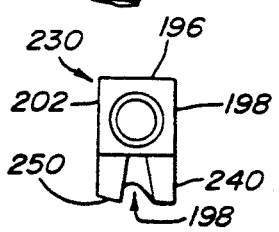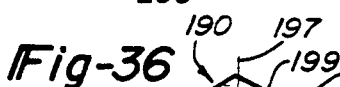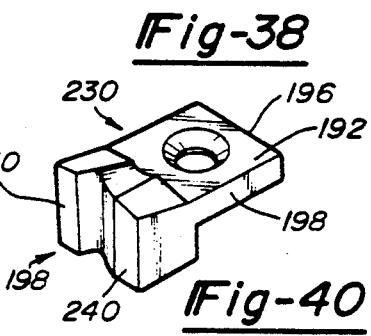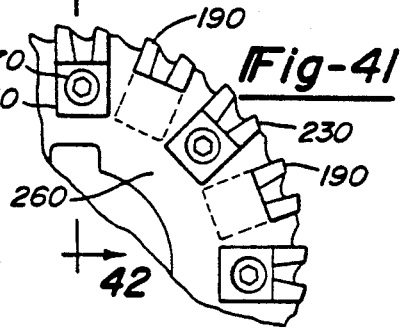

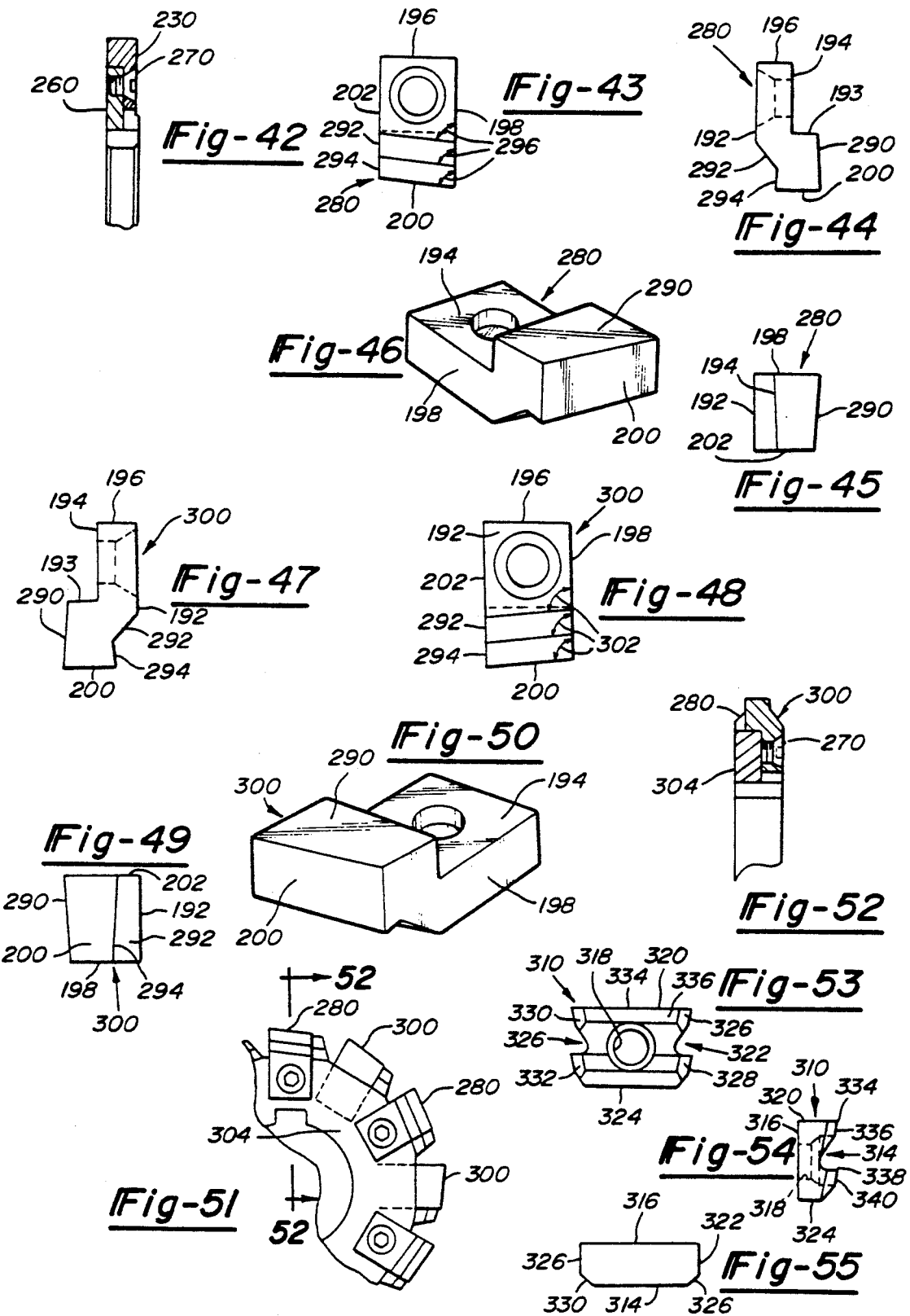

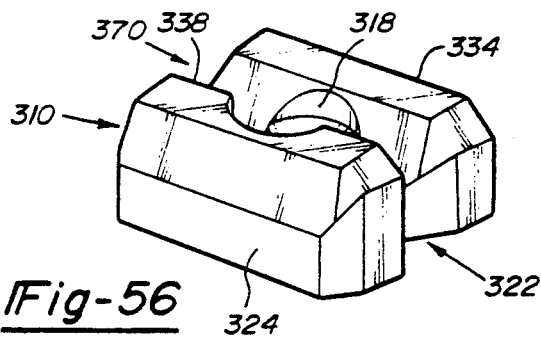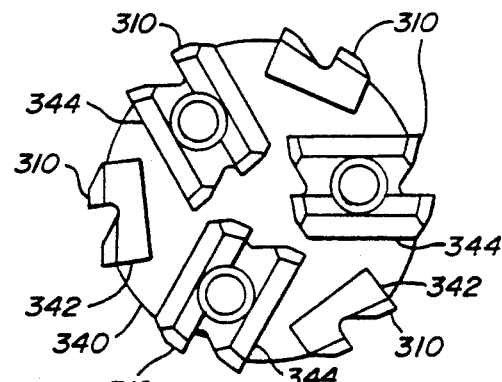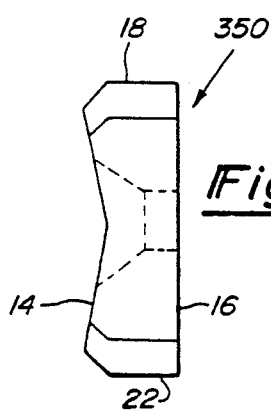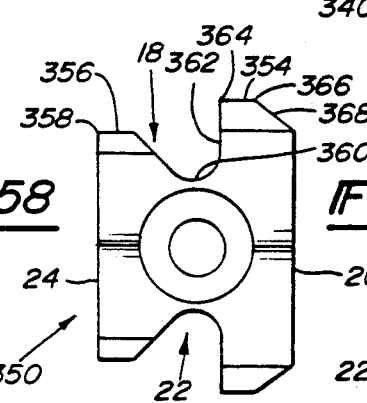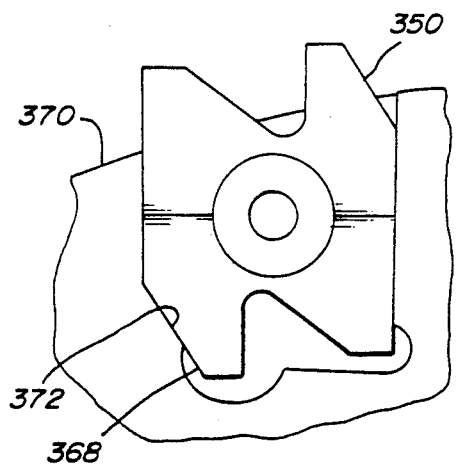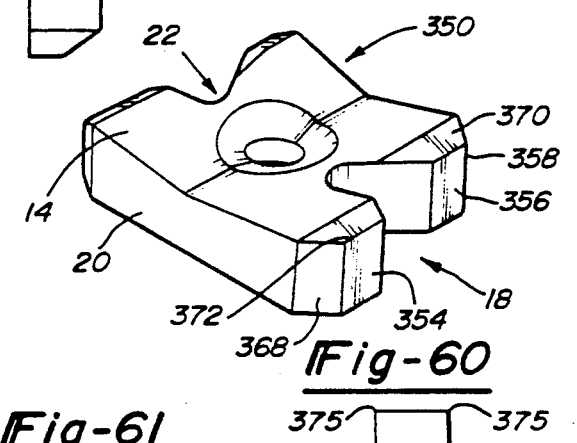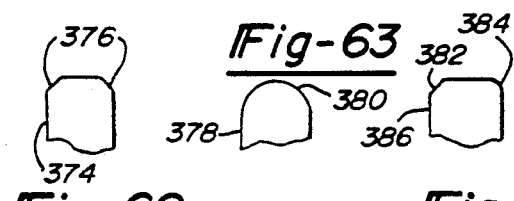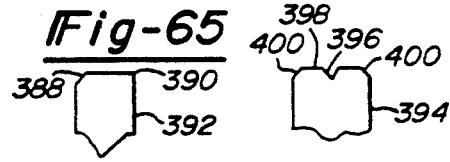

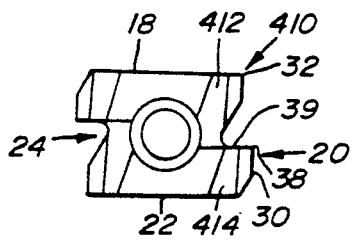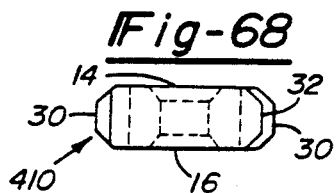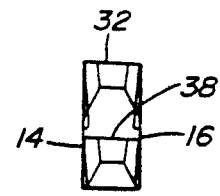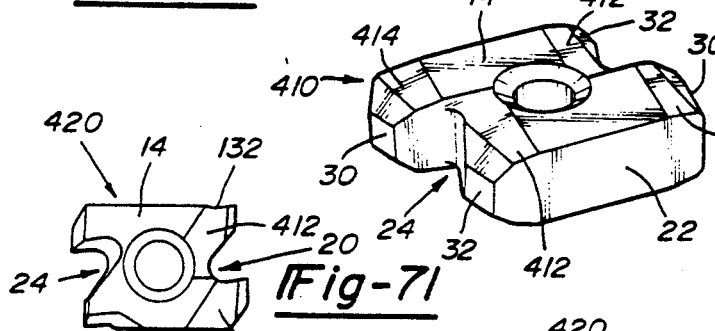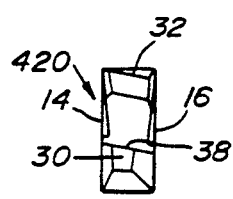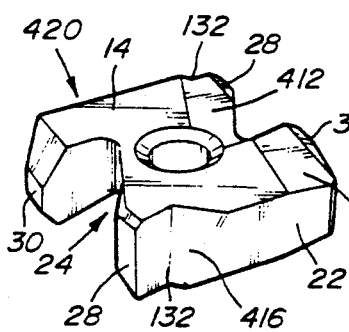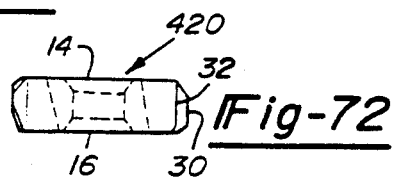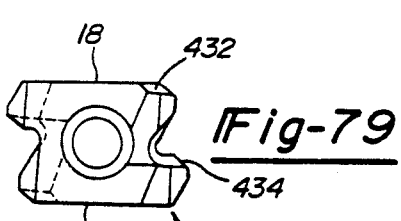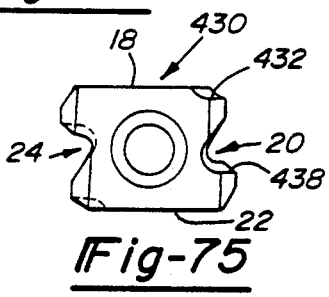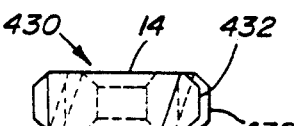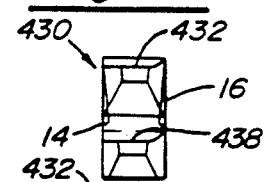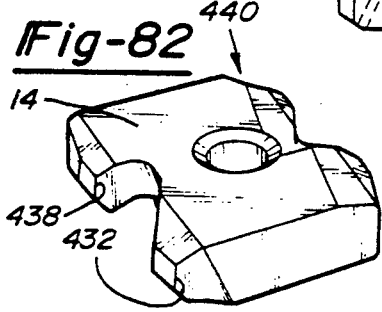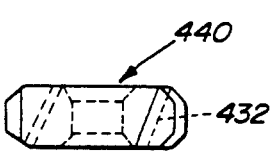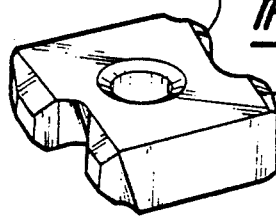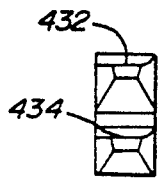

CUTTING INSERT HAVING DUAL CUTTING EDGES ON ONE SURFACE AND HOLDING BODY FOR INSERT

BACKGROUND OF THE INVENTION

1. Field of the Invention

The present invention relates to indexable, cutting tools and in particular to cutting tool as inserts and the holding body which supports the cutting tool inserts for the cutting process.

2. Prior Art

It is known in the art to have cutting tools with indexable replaceable and/or throw-away cutting inserts for machining purposes such as milling, turning, boring, and drilling. The cutting inserts have cutting edges which engage the material that is to be machined. The cutting insert can be made from carbide and may be coated depending upon the material it is cutting. The cutting insert is held in a holding body and the holding body is mounted to a machine spindle which is turned by a machine rotating the holding body and the cutting inserts. Most of the cutting tool inserts have basic geometric shapes such as circles, triangles, squares, etc. As the material is cut by the cutting tool insert, a chip of the material is cut away. Depending upon the material that is being cut the chip can either form a long sharp coiled string or break into smaller chips. A long continuous coiled string can be dangerous to the machine operator because it can start whipping and moving about the work area. It is desirable to break the chip into a small manageable size to be carried away by a chip drag system or by manual removal from the machine. Chip breakers are sometimes used on top of a cutting insert to break up a chip to prevent the long stringy chip from occurring.

It is known to place ribbing across the cutting face of an insert. A cutting tool insert having recesses and a plurality of serrations in the cutting edge was described in U.S. Pat. No. 4,867,616 to Jakubowicz. U.S. Pat. No. 3,701,187 to Erkfritz disclosed inserts with scalloped cutting edges.

SUMMARY OF THE PRESENT INVENTION

The present invention provides a cutting tool insert having two in line cutting edges one behind the other across the width of the insert on a geometric surface or face of the insert. Two cutting edges are thereby provided on one face of the insert with a radius between the two cutting faces. Cutting inserts of the same geometry can be supplied in various widths. In the invention, wider inserts utilize a vertical slit on the lower second cutting edge to further break the chip. The geometry of the two cutting faces is repeated on an opposite side of the cutting insert so when the first sides are worn, the insert can be rotated 180° presenting a fresh set of cutting edges. The insert is released by loosening a screw holding the insert in place to the milling cutter. After the screw is loosened, the insert can be indexed or repositioned thereby presenting two fresh cutting edges on an opposite face to the part to be machined. The advantage of the indexable insert is that it allows for the inserts to be replaced without the entire cutter body being sent back to the tool room to be reground and dimensionally reset.

Cutter bodies have insert pockets precision milled to hold the inserts. Conventionally, an insert would rest on the flats of one of the cutting faces that are opposite to the cut in the pocket of the cutter. This insert has the advantage of possibly resting on a chamfer provided opposite the cutting edge. The chamfer provides a consistent seating surface over time even when the cutting surfaces are reground and part of their surfaces are ground away.

The object of the present invention is to provide a cutting insert having multiple cutting edges. Another object is to include a chip breaking slit on the lower cutting edge of wider versions of the insert. The amount of force required to turn the cutter and the insert in the cut is lessened and thereby less force is required to turn the machine spindle upon which the cutter body having inserts is mounted.

Another advantage is that the use of multiple cutting edges on one face provides the ability to cut thinner walls having a greater number of interruptions. This allows a smoother cut, less wear and tear on the machine and greater insert life.

Other advantages and features of the present invention will become apparent from the following description when read in conjunction with the accompanying drawings.

A further advantage of the invention is to provide seats in the pockets of the holding body upon which the insert is located on its chamfer.

BRIEF DESCRIPTION OF THE DRAWINGS

A better understanding of the present invention will be achieved upon reference to the following detailed description, when read in conjunction with the accompanying drawings, wherein like reference characters refer to like parts and in which:

FIG. 1 is a front view illustrating a prior art cutting tool;

FIG. 2 is a right side view of the insert;

FIG. 3 is a top view of the insert;

FIG. 4 is a perspective view of the insert;

FIG. 5 is a front view illustrating a first variation of the insert according to the present invention;

FIG. 6 is a top view of the insert;

FIG. 7 is a right side view of the insert;

FIG. 8 is a perspective view;

FIG. 9 is a side view of a holding body holding several inserts in multiple orientations;

FIG. 10 is a second variation of the insert having a variation of the mounting bore;

FIG. 11 is a front view of the insert;

FIG. 12 is an end view of the insert;

FIG. 13 is a front view of a third variation of the insert with a larger radius between the two cutting projections;

FIG. 14 is a top view of the insert;

FIG. 15 is an end view of the insert;

FIG. 16 is a perspective view of the insert;

FIG. 17 is a partial front view of a holding body;

FIG. 18 is a side view of the holding body of FIG. 17 taken in the direction of the lines 18—18 of FIG. 17;

FIG. 19 is a perspective view of a variation of an insert having chamfers from one side of cutting projections to the top mounting face;

FIG. 20 is a top view of a fifth variation of the insert;

FIG. 21 is a front view of the insert;

FIG. 22 is an right side view of the fifth variation of an insert;

FIG. 23 is a perspective view of the fifth variation;

FIG. 24 is a front view of a sixth variation of an insert having a positive rake angle on the first cutting projection;

FIG. 25 is a top view of a seventh variation of an insert;

FIG. 26 is a front view of the insert of FIG. 25;

FIG. 27 is a perspective view of the insert of FIG. 26;

FIG. 28 is a front view of an eighth variation of an insert;

FIG. 29 is a top view of the insert of FIG. 28;

FIG. 30 is a right side view of the insert of FIG. 29;

FIG. 31 is a perspective view of the insert of FIG. 30;

FIG. 32 is a partial side view of the insert shown in FIGS. 28-31 mounted in a holding body;

FIG. 33 is a left side view of a ninth variation of an insert;

FIG. 34 is a front view of the insert of FIG. 33;

FIG. 35 is a bottom view of the insert of FIG. 34;

FIG. 36 is a perspective view of the insert shown in FIGS. 33-35;

FIG. 37 is a front view of a tenth variation of an insert;

FIG. 38 is a right side view of FIG. 37;

FIG. 39 is a bottom view of FIG. 37;

FIG. 40 is a perspective view of the insert as shown in FIGS. 37-39;

FIG. 41 is a partial front view of a holding body with the inserts shown in FIGS. 33-40 mounted thereto;

FIG. 42 is a partial sectional view along lines 42—42 of FIG. 41;

FIG. 43 is a front view of an eleventh variation of an insert;

FIG. 44 is a right side view of the insert of FIG. 43;

FIG. 45 is a bottom view of the insert of FIG. 43;

FIG. 46 is a perspective view of the insert shown in FIGS. 43-45;

FIG. 47 is a left side view of a twelfth variation of an insert;

FIG. 48 is a front view of the insert of FIG. 47;

FIG. 49 is a bottom view of the insert of FIG. 47;

FIG. 50 is a perspective view of the insert shown in FIGS. 47-49;

FIG. 51 is a partial front view of a holding body having inserts shown in FIGS. 43-52 mounted to it;

FIG. 52 is a partial sectional view taken along lines 52—52 of FIG. 51;

FIG. 53 is a front view of a thirteenth variation of an insert;

FIG. 54 is a left side view of the insert of FIG. 53;

FIG. 55 is a top view of FIG. 53;

FIG. 56 is a perspective view of the insert shown in FIGS. 53-55;

FIG. 57 is a front view of a holding body with inserts as shown in FIGS. 53-55 mounted to it;

FIG. 58 is a left side view of a fourteenth variation of an insert;

FIG. 59 is a front view of the insert of FIG. 58;

FIG. 60 is a perspective view of the insert shown in FIGS. 58 and 59;

FIG. 61 is a front view of the insert of FIGS. 58-60 shown located on an insert of the chamfer in a holding body;

FIG. 62 is a profile of an insert having chamfered edges;

FIG. 62A is a profile of an insert having sharp corners;

FIG. 63 is a profile of an insert having rounded edges;

FIG. 64 is a profile of an insert having one chamfered and one broken edge;

FIG. 65 is a profile of an insert having one chamfered edge;

FIG. 66 is a profile of an insert having two chamfered edges and a V-groove between the edges;

FIG. 67 is a front view of a fifteenth variation of an insert;

FIG. 68 is a top view of the insert of FIG. 67;

FIG. 69 is a side view of the insert of FIG. 67;

FIG. 70 is a perspective view of the insert of FIGS. 67-69;

FIG. 71 is a front view of a sixteenth variation of an insert;

FIG. 72 is a top view of the insert of FIG. 71;

FIG. 73 is a side view of the insert of FIG. 71;

FIG. 74 is a perspective view of the insert of FIGS. 71, 73;

FIG. 75 is a front view of a seventeenth variation of an insert;

FIG. 76 is a top view of the insert of FIG. 75;

FIG. 77 is a side view of the insert of FIG. 75;

FIG. 78 is a perspective view of the insert of FIGS. 75-77;

FIG. 79 is a front view of an eighteenth variation of an insert;

FIG. 80 is a top view of the insert of FIG. 79;

FIG. 81 is a side view of the insert of FIG. 79; and

FIG. 82 is a perspective view of the insert of FIGS. 79-81.

DETAILED DESCRIPTION OF THE INVENTION AND PREFERRED EMBODIMENT THEREOF

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

FIG. 1 is a front view of a prior art cutting insert generally indicated as 10. The cutting insert 10 has a rectangular shape with a top mounting surface 14 and a parallel back mounting surface 16 as shown in FIGS. 2 and 3. The cutting insert 10 has four faces 18, 20, 22, and 24 extending between and normal to the top and back surfaces 14 and 16 respectively. A mounting bore 26 is provided through the cutting insert along a center line 29 midway between faces 20 and 24. The mounting bore 26 is normal to the top mounting surface 14. The mounting bore 26 is counter sunk at both ends to provide a truncated conical surface 27 at opposite ends thereof where it meets the top and bottom mounting surfaces 14 and 16 respectively. The two faces 20 and 24 are on opposite sides of the centerline 29 of the insert 10. The two opposite faces 20 and 24 each have two cutting projections 28 and 30. The first cutting projection 28 has a first cutting edge 32, a flat portion 34 generally parallel to centerline 29 and a slope portion 36 which slopes inwardly from the flat portion 34. The intersection of the flat portion 34 and side 18 or 22 constitutes a first cutting edge 32. The second cutting projection 30 has a first flat portion 39 generally perpendicular to centerline 29 and a second flat portion 40 generally parallel to centerline 29. The edge formed between flat portion 39 and 40 constitutes a second cutting edge 38. The second cutting projection also has a slope portion 42 extending from the flat portion 40 and terminates at the adjacent side face 18 or 22. A radius 44 connects the slope portion 36 of the first cutting projection 28 to the first flat portion 39 of the second cutting projection 30. The cutting edges 32 and 38 are essentially parallel to each other and normal to the top and back surfaces 14 and 16 respectively.

FIG. 2 shows a right side view of the prior art insert 10 shown in FIG. 1. The top and bottom surfaces of the first projections 28 are chamfered to provided chamfered surfaces 46. In a like manner the top and bottom surfaces of the second projections 30 are chamfered to provide chamfered surfaces 47 on opposite sides of the second projection.

FIG. 3 is a top view of prior art insert 10 illustrating that cutting projections 30 extend further from the centerline 29 of insert 10 than cutting projections 28.

FIG. 4 is a perspective view of prior art insert 10.

FIGS. 5 through 8 show a first variation 50 of the cutting insert 10. The first variation 50 has two cutting projections 52 and 54 on each of the two opposite faces 56 and 58 which correspond to the cutting projections of the prior art shown in FIGS. 1–4. As is shown in FIG. 6 the second cutting projections 54 of the first variation 50 have a centrally disposed V-shaped groove provided in its flat portion 58 which is equivalent to second flat portion 40 of the second cutting projections 30 shown in FIGS. 1–3.

FIG. 7 is a side view of and FIG. 8 is a perspective view of insert 50 clearly showing that the V-groove 60 divides the cutting edge 38 into two smaller cutting edges 38' and 38".

A cutting insert 10 is shown in FIG. 9 mounted to a holding body 62 positioned at location 11. Additional inserts 10 can be mounted at position 13 and 15 normal to insert 10 mounted at location 11 to provide radial and linear cutting. A corresponding cutting insert 10 can also be mounted on the opposite side of the holding body displaced 180° from position 11 and positions 13 and 15 as needed for the desired machining result.

A second variation 70 of the insert 10 is shown in FIGS. 10–12. The variation 70 has the mounting bore 72 extending through the insert 70 from one face 74 having cutting projections 76, 78 to the other face 80 also having cutting projections 76, 78.

A third variation 90 of the insert 10 is shown in FIGS. 13–16. In this variation 90, a radius 92 is provided between the cutting projections 94 and 96. The radius 92 is larger than the radius 44 shown in FIG. 4.

A partial front view of a holding body 98 is shown in FIG. 17. Inserts 90 are mounted along the periphery of the holding body 98. The insert 91 is shown in the pocket 97 of the body 98. The slope portions 36 and 42 of insert 91 are located against respective mating sloped portions 93, 95 provided in the holding body 98.

FIG. 18 is a side view taken along lines 18—18 in FIG. 17. Inserts 90 are positioned in pockets 97 and 99 which are provided on opposite sides of the holding body 98 in an alternating manner as shown.

A fourth variation 100 of the cutting insert 10 is shown in FIG. 19. Insert 100 has chamfers 102 and 103 provided on one side of both the first cutting edge projections 106 and the second cutting projection 104. The chamfer 102 is provided along one edge of the cutting projections 104. A V-groove 105 divides the second cutting projection 104. Chamfer 103 is also provided along one edge cutting projections 106. The fourth variation 100 is similar to the third variation 90 of the insert but this embodiment 100 has a V-groove 105 in the second cutting projection 104.

In the fifth variation 120 of cutting insert 10 shown in FIGS. 20, 21, 22 and 23 chamfer 102, 1-3 extends from the top mounting surface 114 toward the edge surface 112. In the top view of the insert, FIG. 20 chamfers 102 and 103 also extend from the bottom mounting surface 116 towards the edge surface 108 of the insert 120.

The sixth variation 130 of the cutting insert 10 shown in FIG. 24 has a detent 132 close to the first cutting edge 134 along the face 136. The detent 132 creates a positive rake angle 138 at the cutting edge as measured from the face 136.

A seventh variation 140 on an insert is shown in FIGS. 25–27. The insert 140 has a top surface 142 and a bottom surface 144 and a mounting bore 146 between the top and bottom mounting surfaces 142, 144. Four faces 148, 150, 152 and 154 extend from the top and bottom mounting surfaces 142, 144. A first cutting edge 156 and a second cutting edge 158 are created respectively on a first cutting projection 160 and a second cutting projection 162 on the opposing faces 150 and 154. The first cutting edge 156 is at the intersection of the face 152 and a flat portion 164 on the first cutting projection 160. From the first cutting edge 156 the flat portion 164 extends into a sloped portion 166 to a radius 168 which leads to a flat portion 171 generally normal to the flat portion 160.

The flat portion 171 and a flat portion 172 on the second cutting projection 162 intersect at the second cutting edge 158. The flat portion 172 extends to a sloped portion 174 which extends to face 148.

FIGS. 28–31 show an eighth embodiment 170 of an insert similar to the sixth variation 130 of FIG. 24; the insert 130 has an inclined top surface 172 and an inclined bottom surface 174 and four opposing faces 176, 178, 180 and 182. In this variation 170 the inclined top surface 172 and the incline bottom surface 174 are parallel to each other and are sloped from near one face 178 to another face 182.

Insert variation 170 is shown in holding body 184 (partial view) in FIG. 32. The insert variation 170 is alternatingly staggered on the front 186 and the back 188 of the holding body 184.

FIGS. 33–36 show a ninth variation 190 of the insert 10. This variation 190 is a right hand style.

The variation 190 has a generally oblong shape with a top surface 192 and a bottom mounting surface 194 and four faces 196, 198, 200 and 202. A surface 193 extends normal to bottom mounting surface 194. A mounting bore 195 extends normal to a centerline 197, between the top surface 192 and the bottom mounting surface 194.

A first cutting projection 204 and a second cutting projection 206 are disposed on face 200. A first cutting edge 208 generally parallel to the centerline 197 is created at the intersection of face 202 and a flat surface 210 of the first cutting projection 204. A slope 212 extends from the flat surface 210 and continues into a radial surface 214 and a flat surface 216. A second cutting edge 218 generally parallel to the centerline 197 is created at the intersection of the flat surface 216 and an angled surface 220. A first raised section 222 of the top mounting surface 192 located on the first cutting projection 204 and a second raised section 224 over the second cutting projection 206 are raised higher than the top mounting surface 192. A radius 226 is formed between the first raised section 222 of the top mounting surface 192 and the second raised section 224 of the second cutting projection 206. A second radius 228 is formed on the bottom mounting surface 194.

FIGS. 37-40 show a tenth variation 230 of the insert 10 which is a left hand style of the ninth variation 190 of FIGS. 33-36.

In variation 230 a first cutting edge 240 and second cutting edge 250 are reversed from the ninth variation shown on FIG. 34.

FIG. 41 is a partial front view of a holding body 260 having cutting inserts 230 and 190 mounted alternatingly along the periphery of the holding body.

A partial side sectional view of holding body 260 of FIG. 41 is shown in FIG. 42. The holding body 260 has a cutting insert 230 mounted on its periphery. A screw 270 is placed through the mounting bore 195 and holds the cutting insert 230 to the holding body 260.

An eleventh variation 280 of a cutting insert 10 is shown in FIGS. 43-46. This variation 280 is called a "left hand" insert. A bottom second surface 290 extends lower than the bottom first surface 194. The bottom second surface 290 intersects face 200 at less than 90°. The top first surface 192 has a sloped downward portion 292 that intersects a top second surface 294 that intersects face 200 at less than a right angle. FIG. 43 shows back face 196, right side face 198, front face 200 and left side face 202. These faces are generally normal to the top first face 192 and the bottom first face 194. The line of intersection of the first top face 192 to the sloped downward portion 292 forms an acute angle 296 with the edge of face 198 in a direction towards face 196, as seen in FIG. 43. The acute angle 296 is repeated at both the intersection of the sloped downward portion 292 to the flat surface 294 and the intersection on the flat surface 294 to the face 200. Flat surface 294 tapers inwardly towards bottom second surface 290 from where it touches right side face 198 to where it touches left side face 202 as seen in FIG. 45.

FIGS. 47-50 show a twelfth variation 300 on an insert 10. This variation 300 is a right hand version of the left hand variation 280. The variation 300 is similar to the variation 280 except that the angle 302 formed between the top first surface 192 and the sloped downward surface 292 forms an obtuse angle with right side face 198 as best seen in FIG. 48. FIG. 48 shows two other faces forming obtuse angles. Sloped downward surface 292 when intersecting the flat surface 294 also forms an obtuse angle 302 with right side face 198. The intersection of flat surface 294 with face 200 also forms an obtuse angle 302 with face 198.

The bottom view FIG. 49 of cutting insert 300 shows the intersection of surface 294 tapering closer to raised bottom surface 290 at face 198 than at face 202.

Cutting inserts 280 and 300 are shown in a front view alternatingly mounted to a holding body 304 in FIG. 51. This mounting is particularly suited to the process of form grooving.

FIG. 52 is a partial sectional view of the holding body 304 with cutting insert 280 of FIG. 51.

Cutting tool variation thirteen 310 of insert 10 is visually described by FIGS. 53-57. FIG. 53 shows a front view of the cutting tool insert 310 which has a top surface 314 and a bottom surface 316. A mounting bore 318 runs from the top surface 314 to the bottom surface 316. The side view in FIG. 54 shows the mounting bore 318 through the cutting tool 310. A first cutting projection 326 extends from face 322 near face 320. FIG. 55 is a top view of the cutting tool 310.

A second cutting projection 328 extends from face 322 near face 324. A cutting edge 326 is formed on the first cutting projection 328. Another cutting edge 334 is at the intersection of face 320 with the flat surface 326.

The first cutting projection 326 extends across the top surface 314 near face 320 and terminates at a duplicate of the first projection 330 on face 326.

The second cutting projection 328 extends across the top surface 314 near face 324 and terminates in a duplicate second projection 332 on face 326.

A continuation of the first cutting edge 334 is formed at the intersection of face 320 with the flat surface 336 of the extension of the first cutting projection 326. A perspective view, FIG. 56 shows the cutting edges 334 and 338.

FIG. 57 shows a front view of a holding body 340 having inserts 310 mounted both axially and radially for diameter cutting at position 342 and surface cutting at position 344.

The fourteenth variation 350 of the cutting tool insert 10 is shown in FIGS. 58-60. This variation 350 has a top surface 14 and a bottom surface 16 and four faces 18, 20, 22 and 24 extending normal to the bottom surface 16. The top surface 14 tapers inwardly towards the bottom surface 16 as shown. Top surface 14 tapers from opposite faces 18 and 22 towards a mounting bore 26 centered in the cutting tool insert 350. A first cutting projection 352 and a second cutting projection 354 extend from the face 18. The second cutting projection 354 extends outwardly further than the first cutting projection 352. The first cutting projection 352 has a flat portion 356 and a cutting edge 358 formed at the intersection of the flat portion 356 and the face 24. A sloped portion 358 extends from the flat portion 356. A radius 360 joins the sloped portion 358 to a flat portion 362 basically parallel to faces 20 and 24. A second cutting edge 364 is created at the intersection of the flat portion 362 with a flat portion 366 on cutting projection 354. A sloped portion 368 connects the flat portion 366 to the face 20. A chamfer 370 is cut from the top face 14 to the first cutting projections 356. A chamfer 372 is cut from the top surface 14 to the second cutting projection 354. In FIG. 61 the cutting insert 350 is mounted to a holding body 370. The cutting insert 350 is located on the sloped portion 368 extending from the second cutting projection 354. The sloped portion 368 locates against a mating sloped portion 372 provided in the holding body 370.

The cutting insert 10 can be modified to cut various forms. FIG. 62 shows the profiled form 374 having two chamfered edges 376, 376. FIG. 62a shows the profiled form 373 having sharp corners 375, 375. FIG. 63 is the profiled form of an insert 378 having a rounded edge 380.

One chamfered edge 382 and one radiused edge 384 are shown in the insert 386 of FIG. 64.

A chamfered edge 388 and a sharp corner edge 390 are shown on insert 392 of FIG. 65. FIG. 66 shows an insert 394 with a V-groove 396 along an edge 398 which has chamfer 400, 400 on both sides of the V-groove 396.

A fifteenth variation 410 of an insert 10 for use with a slitting saw is depicted in FIGS. 67-70. This cutting insert 410 is similar to the insert 10 shown in FIGS. 1-4. The differences are that behind the first cutting edge 32 a first tapered diagonal portion 412 is cut from top surface 14 and runs diagonally from the first cutting projection 34 starting at face 18, towards the mounting bore 26 and terminating in line with the flat portion 39 of the second cutting projection 30. A second tapered diagonal portion 414 cuts across top surface 14 from the flat portion 30 of the second cutting projection 30 to face 22. This positioning of the tapered diagonal portions is repeated on the cutting projections on the opposite face 24 and also on the bottom mounting face 16.

A sixteenth variation 420 is shown in FIGS. 71-74. This cutting tool insert 420 is useful for slitting operations on aluminum material and it is similar to FIG. 24 in that it has a detent 132. The top surface 14 is treated like the insert 410 and has diagonal tapered portions 412 and 414. Behind the detent 132 on face 18 a tapered portion 416 cuts in towards the back mounting face 16. The reverse of this is shown in FIG. 74 where detent 132 is shown cut back from face 22. The tapered portion 416 extends from the detent 132 towards face 22.

FIGS. 75-78 show a seventeenth variation 430 of an insert 10. Cutting tool insert 430 has a reground area behind the first and the second cutting edges 432, 434.

An eighteenth variation 440 of a cutting insert 10 is shown in FIGS. 79-81. This cutting tool variation 440 is similar to the fifteenth cutting tool variation 410 of FIGS. 67-70 because it has a first tapered diagonal portion 412 and a second tapered diagonal portion 414. The difference being that cutting tool insert 440 can be reground behind the cutting edges for reground areas 432, 434.

I claim:

1. A cutting tool insert comprising:
   a body having a top surface and a bottom surface; and four edge faces disposed between said top and said bottom surfaces;
   at least two of said edge faces being opposite to each other and equally spaced from a centerline of said body; each of said at least two opposite edge faces having at least a first and a second cutting projection;
   a groove in said second cutting projection.

2. The cutting tool insert as claimed in claim 1 having a centrally disposed mounting bore extending therethrough from said top surface to said bottom surface of said body.

3. The cutting tool insert as claimed in claim 2 wherein said at least first cutting projection has a first cutting edge and said second cutting projection has a second cutting edge and each of said first and second cutting edges are parallel to said mounting bore extending through said body.

4. The cutting tool insert as claimed in claim 1 wherein said top and bottom surfaces of said body have a substantially rectangular shape.

5. The cutting tool insert as claimed in claim 3 wherein said second cutting projection has a groove.

6. The cutting tool insert as claimed in claim 5 wherein said groove is normal to said cutting edge and divides said cutting edge into two cutting edges separated from each other by said groove.

7. The cutting tool insert as claimed in claim 6 wherein said groove has a substantially V shape, said substantially V shape groove has a bottom edge, said bottom edge of said substantially V shape groove having a constant depth from said cutting edge toward one of said four edge faces; said substantially V shape groove extends across said second cutting projection.

8. The cutting tool insert as claimed in claim 7 wherein said groove divides said second cutting edge into two cutting edges of equal lengths.

9. The cutting tool insert as claimed in claim 3 wherein said cutting edge of said second cutting projection extends farther from centerline of said body than said cutting edge of said first cutting projection.

10. The cutting tool insert as claimed in claim 9 wherein said first cutting projection has a flat portion, a sloped portion extending from an end of said flat portion opposite said first cutting edge and a radius connecting said slope portion to said second cutting projection.

11. The cutting tool insert as claimed in a claim 10 wherein said at least one of said first and said second cutting projections has at least one chamfer provided along a side thereof adjacent to one of said top surface and said bottom surface.

12. A holder for a cutting tool insert, said insert having a body, said body having a predetermined shape, said body comprising a top surface, a parallel bottom surface, and four faces normal to said top and bottom surfaces, at least two of said four faces, being opposite of each other, said at least two faces each having at least two cutting projections, said holder comprising:
   a holder body mountable to a machine, said holder body having a periphery;
   at least one pocket for holding at least said insert near said periphery of said holder body with said two cutting projections of said cutting tool insert extending outwardly from said holder body beyond said periphery; and
   said at least one pocket for holding said insert being configured to said predetermined shape of said body.

13. The holder as claimed in claim 12 wherein said holder body has a first side and a parallel second side and wherein said first side of said holder body has at least one pocket for holding at least one of said inserts near said periphery; and said second side of said holder body has at least one pocket for holding at least a second of said inserts.

14. The holder as claimed in claim 13 wherein said first and second sides have a plurality of pockets, said plurality of pockets are alternatingly spaced around the periphery of said holder body such that each pocket on said first side of said holder body is located intermediate between two adjacent pockets on said second side of said holder body.

15. The holder body as claimed in claim 12 wherein said first projection of said cutting insert has a first cutting edge and said second projection has a second cutting edge, each cutting projection having a flat portion extending from said first and second cutting edges respectively and a slope portion extending from an end of said flat portion opposite said cutting edge; and wherein said pocket of said holder body is configured to locate said cutting insert on said slope portion extending from said flat portion of each said first and said second cutting projections.

16. A cutting tool insert comprising:
   a top first surface, a bottom first surface, four face surfaces generally normal to said top first surface and said bottom first surface;
   two of said four face surfaces being opposite each other and being side face surfaces;
   another of said four face surfaces being a back face surface, and another of said four face surfaces opposite to said back face surface being a front face surface;

a mounting bore extending through said cutting tool insert from said top first surface to said bottom first surface;

a top second surface lower than said top first surface;

a tapered surface from said top first surface to said top second surface;

a bottom second surface lower than said bottom first surface;

a flat surface normal to said bottom first surface between said bottom first surface and said bottom second surface; and a face surface on said front face surface between said top second surface and said bottom second surface, said tapered surface from said top first surface to said top second surface angling from one of said two side face surfaces of said four face surfaces to another one of said two side face surfaces.

17. The cutting tool insert as claimed in claim 16, wherein one of said two side face surfaces of said four face surfaces is a left side face surface and the other of said two side face surface of said four face surfaces is a right side face surface.

18. The cutting tool insert as claimed in claim 17, wherein said tapered surface is on said front face surface of said four face surfaces;

said tapered surface tapers away from an intersection with said left side face surface of said two side face surfaces of said four face surfaces towards said right side face surface of said two side face of said four face surface; and an intersection of said tapered surface with said right side face surface of said two side faces is closer to said back face surface than said intersection of said tapered surface with said left side face surface of said two side faces.

19. The cutting tool insert as claimed in claim 17 wherein said tapered surface is on said front face surface of said four face surfaces;

said tapered surface tapers away from an intersection with said right side face surface of said two side faces of said four face surfaces towards said left side face surface; and an intersection of said tapered surface with said left side face surface is closer to said back face surface than to said intersection of said tapered surface with said right side face surface.

20. A cutting tool insert for use with a cutting tool holder comprising:

a top first surface, a bottom first surface, four face surfaces generally normal to said top first surface and said bottom first surface;

two of said four face surfaces being opposite each other and being side face surfaces;

another of said four face surfaces being a back face surface, and another of said four face surfaces opposite to said back face surface being a front face surface;

means for mounting said cutting tool insert to said cutting tool holder;

a top surface lower than said top first surface;

a tapered surface from said top first surface to said top second surface;

a bottom second surface lower than said bottom first surface;

a flat surface normal to said bottom first surface between said bottom first surface and said bottom second surface; and a face surface on said front face surface between said top second surface and said bottom second surface, said tapered surface from said top first surface to said top second surface angling from one of said two side face surfaces of said four face surfaces to another one of said two side face surfaces.

* * * * *